(12) United States Patent
Tomita et al.

(10) Patent No.: US 9,909,913 B2
(45) Date of Patent: Mar. 6, 2018

(54) ONBOARD SYSTEM, ONBOARD DEVICE, INFORMATION PROCESSING METHOD, AND INFORMATION PROCESSING PROGRAM

(71) Applicant: TECHTOM LTD., Tokyo (JP)

(72) Inventors: Naoki Tomita, Tokyo (JP); Isamu Tsutsui, Tokyo (JP)

(73) Assignee: TECHTOM LTD., Tokyo (JP)

( * ) Notice: Subject to any disclaimer, the term of this patent is extended or adjusted under 35 U.S.C. 154(b) by 0 days.

(21) Appl. No.: 15/533,707

(22) PCT Filed: Dec. 15, 2015

(86) PCT No.: PCT/JP2015/085074
§ 371 (c)(1),
(2) Date: Jun. 7, 2017

(87) PCT Pub. No.: WO2016/098770
PCT Pub. Date: Jun. 23, 2016

(65) Prior Publication Data
US 2017/0363456 A1 Dec. 21, 2017

(30) Foreign Application Priority Data
Dec. 19, 2014 (JP) .................. 2014-258081

(51) Int. Cl.
G01F 9/00 (2006.01)
B60R 16/023 (2006.01)
G01C 21/26 (2006.01)
(52) U.S. Cl.
CPC .......... *G01F 9/001* (2013.01); *B60R 16/0235* (2013.01); *G01C 21/26* (2013.01)
(58) Field of Classification Search
CPC .................... G01F 9/001; B60R 16/0235
See application file for complete search history.

(56) References Cited

U.S. PATENT DOCUMENTS 7,693,651 B2   4/2010   Proefke et al.

FOREIGN PATENT DOCUMENTS

JP     7-77058 A      3/1995
JP     11-14381 A     1/1999
(Continued)

OTHER PUBLICATIONS

International Search (ISR) and Written Opinion (WO) dated Jan. 19, 2016 for International Application No. PCT/JP2015/085074.

(Continued)

*Primary Examiner* — Brian Zimmerman
*Assistant Examiner* — Sara Samson
(74) *Attorney, Agent, or Firm* — Ladas & Parry LLP

(57) ABSTRACT

An onboard system that reduces a mental pressure on a driver includes a remaining amount detector that detects a remaining amount of a power source remaining in a vehicle, a lighting detector that detects that a low power source indicator provided in the vehicle lights up, a lighting remaining amount storage unit that stores, as a lighting remaining amount, the remaining power source amount detected by the remaining amount detector at a timing at which the lighting detector detects the lighting of the low power source indicator, a notification remaining amount detector that detects a remaining power source amount larger by a predetermined amount than the lighting remaining amount stored in the lighting remaining amount storage unit, and a notifier that notifies information for promoting supply of the power source after the remaining power source amount larger than the lighting remaining amount by the predetermined amount is detected before the lighting remaining amount is detected.

12 Claims, 11 Drawing Sheets

(56) References Cited

FOREIGN PATENT DOCUMENTS

| JP | 2003-166868 A | 6/2003 |
|----|---------------|--------|
| JP | 2012-158294 A | 8/2012 |

OTHER PUBLICATIONS

J-PlatPat English abstract of JP 2012-158294 A.
J-PlatPat English abstract of JP 7-77058 A.
J-PlatPat English abstract of JP 11-14381 A.
J-PlatPat English abstract of JP 2003-166868 A.

IT IS ABOUT TIME TO CONSIDER FUELING.
SERVICE STATIONS NEARBY ARE AS FOLLOWS.
SELECT SERVICE STATION TO BE SET AS DESTINATION TO PASS.

|  | DIRECTION AND DISTANCE | NECESSARY FUEL AMOUNT | ARRIVAL TIME | PRICE | PRESENCE/ ABSENCE OF DISCOUNT | ... |
|---|---|---|---|---|---|---|
| SERVICE STATION A | 2 KM NORTH | 0.25L | 12:35 | ¥142/L | ABSENT | |
| SERVICE STATION B | 3 KM EAST | 0.35L | 12:30 | ¥145/L | PRESENT | |
| SERVICE STATION C | 3.5 KM WEST | 0.45L | 12:45 | ¥135/L | ABSENT | |
| ... | ... | ... | ... | ... | ... | |

F I G. 2B

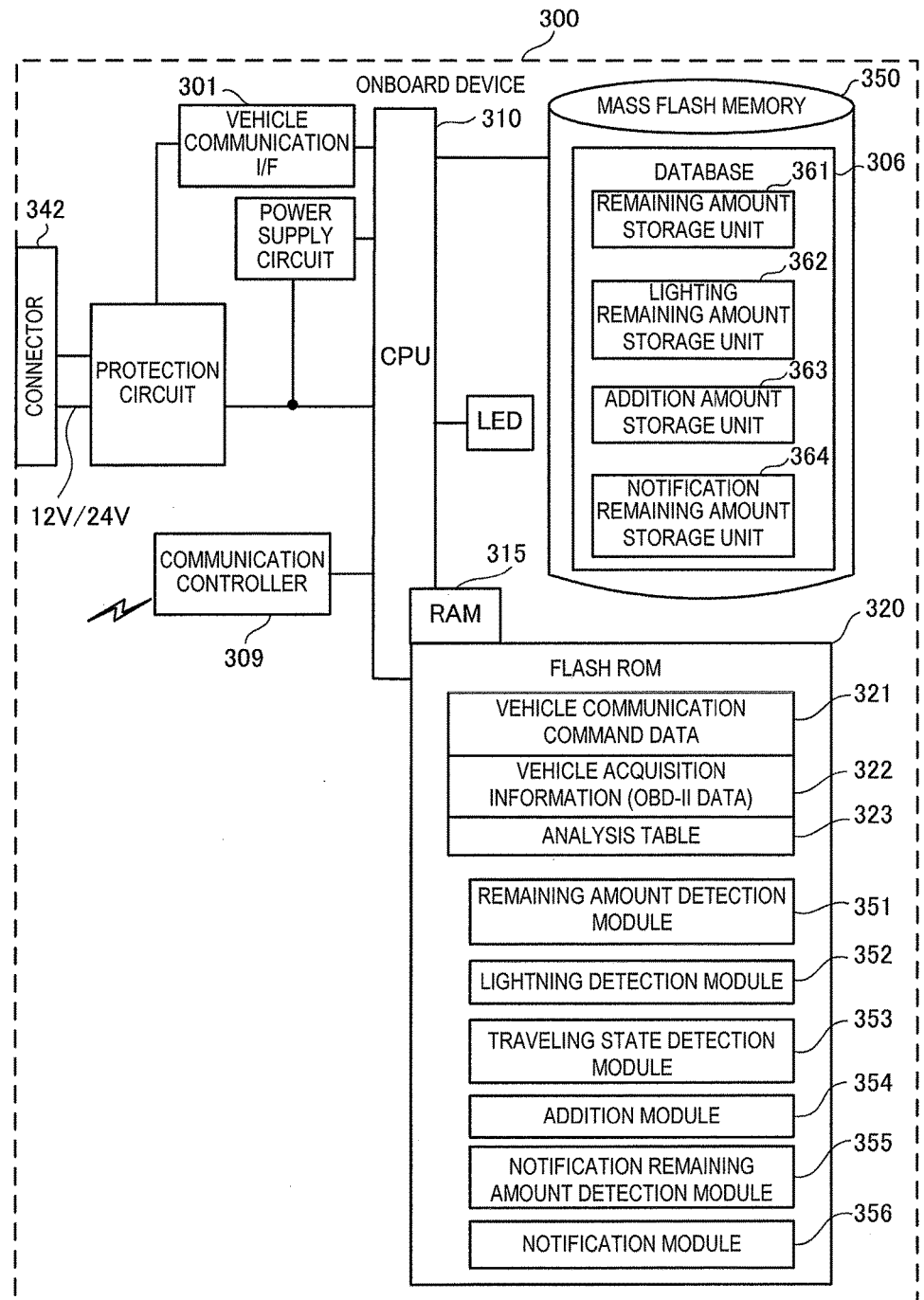
F I G. 3B

| PID | | CONTENTS |
|---|---|---|
| 0 | 00 | PID CORRESPONDING STATE |
| 1 | 01 | NUMBER OF STORED FAULT CODES |
| 2 | 02 | FAULT CODE |
| 3 | 03 | CONTROL STATE OF $O_2$ SENSOR |
| 4 | 04 | ENGINE LOAD |
| 5 | 05 | ENGINE COOLING WATER TEMPERATURE |
| 6 | 06 | FUEL ADJUSTMENT CORRECTION VALUE OF $O_2$ SENSOR 1 (HIGH RESPONSE) |
| 7 | 07 | FUEL ADJUSTMENT CORRECTION VALUE OF $O_2$ SENSOR 2 (LOW RESPONSE) |
| 8 | 08 | FUEL ADJUSTMENT VALUE OF $O_2$ SENSOR 2 (HIGH RESPONSE) |
| 9 | 09 | FUEL ADJUSTMENT VALUE OF $O_2$ SENSOR 2 (LOW RESPONSE) |
| 10 | 0A | FUEL PRESSURE |
| 11 | 0B | INTAKE PIPE ABSOLUTE PRESSURE |
| 12 | 0C | ROTATIONAL SPEED OF ENGINE |
| 13 | 0D | SPEED |
| 14 | 0E | IGNITION TIME |
| 15 | 0F | ENGINE INTAKE AIR TEMPERATURE |
| 16 | 10 | ROTATIONAL SPEED OF ENGINE |
| 17 | 11 | DEGREE OF ENGINE THROTTLE OPENING |
| 18 | 12 | STATE OF SECONDARY AIR PULSE INDUCTION SYSTEM |
| 19 | 13 | POSITION OF FAULT DIAGNOSIS $O_2$ SENSOR |
| 20 | 14 | VOLTAGE/FUEL ADJUSTMENT VALUE OF FAULT DIAGNOSIS $O_2$ SENSOR 1 |
| 21 | 15 | VOLTAGE/FUEL ADJUSTMENT VALUE OF FAULT DIAGNOSIS $O_2$ SENSOR 2 |
| 22 | 16 | VOLTAGE/FUEL ADJUSTMENT VALUE OF FAULT DIAGNOSIS $O_2$ SENSOR 3 |
| 23 | 17 | VOLTAGE/FUEL ADJUSTMENT VALUE OF FAULT DIAGNOSIS $O_2$ SENSOR 4 |
| 24 | 18 | VOLTAGE/FUEL ADJUSTMENT VALUE OF FAULT DIAGNOSIS $O_2$ SENSOR 5 |
| 25 | 19 | VOLTAGE/FUEL ADJUSTMENT VALUE OF FAULT DIAGNOSIS $O_2$ SENSOR 6 |
| 26 | 1A | VOLTAGE/FUEL ADJUSTMENT VALUE OF FAULT DIAGNOSIS $O_2$ SENSOR 7 |
| · | · | VOLTAGE/FUEL ADJUSTMENT VALUE OF FAULT DIAGNOSIS $O_2$ SENSOR 8 |
| · | · | CORRESPONDING FAULT DIAGNOSIS STANDARD |
| · | · | POSITION OF FAULT DIAGNOSIS $O_2$ SENSOR |
| · | · | STATE OF EXTERNAL POWER EXTRACTION DEVICE |
| · | · | ELAPSED TIME AFTER ENGINE START |
| · | · | REMAINING AMOUNT |
| · | · | LOW FUEL INDICATOR |

F I G. 3E

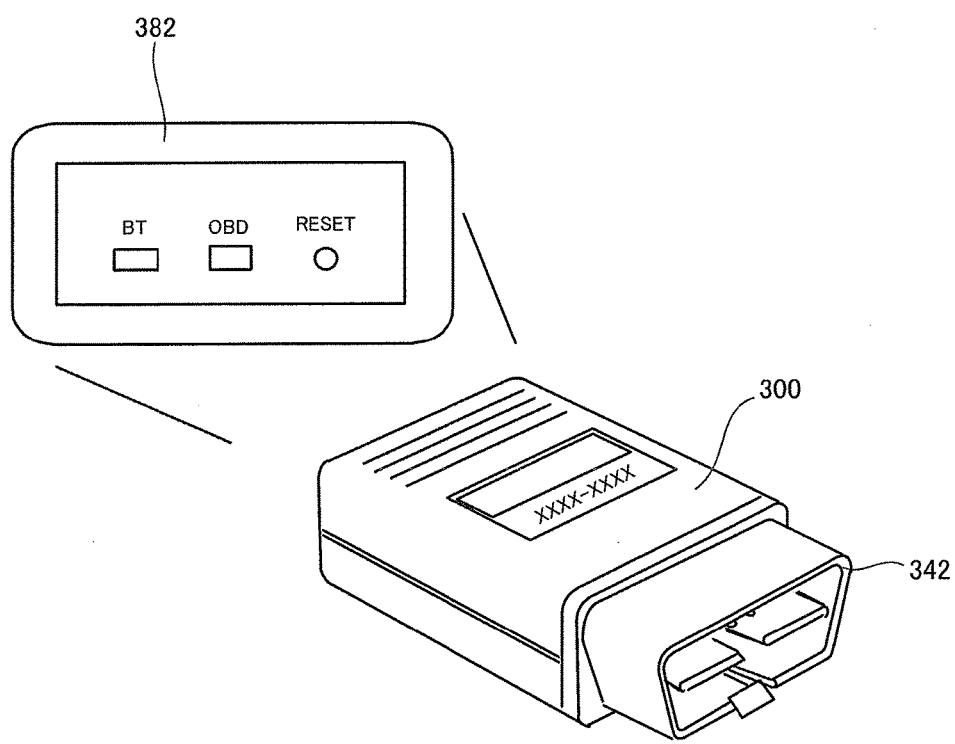
F I G. 3F

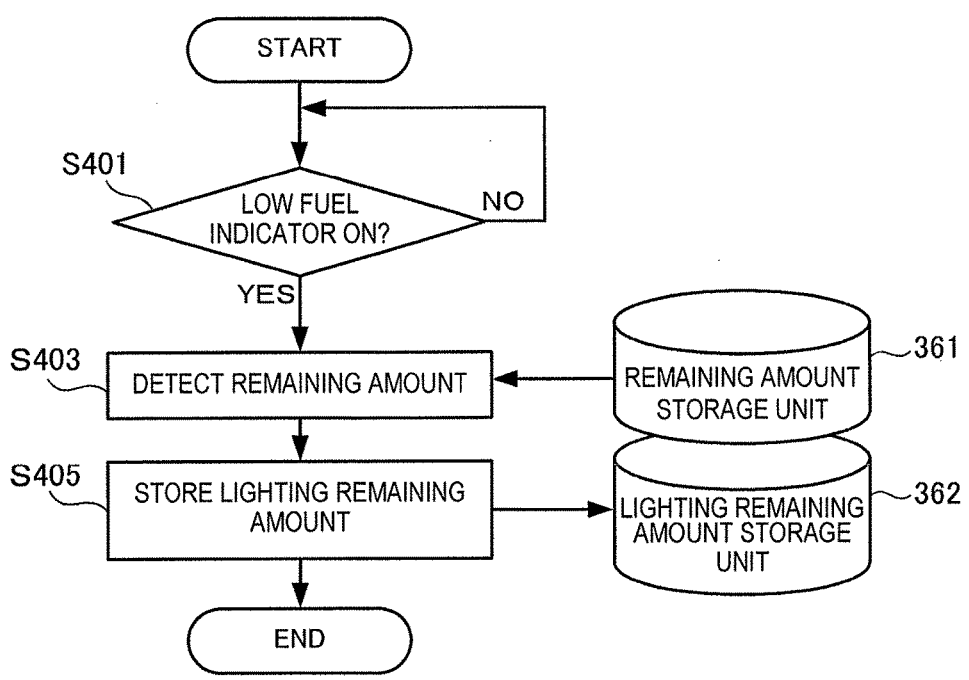
F I G. 4

ONBOARD SYSTEM, ONBOARD DEVICE, INFORMATION PROCESSING METHOD, AND INFORMATION PROCESSING PROGRAM

RELATED APPLICATION

This application is an application under 35 U.S.C. 371 of International Application No. PCT/2015/085074 filed on Dec. 15, 2015, the entire contents of which are incorporated herein by reference.

TECHNICAL FIELD

The present invention relates to an onboard system, an onboard device, an information processing method, and an information processing program.

BACKGROUND ART

In the above-described technical field, patent literature 1 discloses a technique of detecting a remaining fuel by a fuel sensor and calculating a distance that a vehicle can travel by the remaining fuel.

CITATION LIST

Patent Literature

Patent literature 1: Japanese Patent Laid-Open No. 2003-166868

SUMMARY OF THE INVENTION

Technical Problem

However, the technique described in the above literature cannot provide various kinds of information to a driver before lightning of a low fuel indicator provided in a vehicle. That is, it is impossible to reduce a mental pressure on the driver who is urged to find a power source supply point in a hurry after the low fuel indicator lights up.

The present invention enables to provide a technique of solving the above-described problem.

Solution to Problem

One aspect of the present invention provides an onboard system comprising:

a remaining amount detector that detects a remaining amount of a power source remaining in a vehicle;

a lighting detector that detects that a low power source indicator provided in the vehicle lights up;

a lighting remaining amount storage unit that stores, as a lighting remaining amount, the remaining power source amount detected by the remaining amount detector at a timing at which the lighting detector detects the lighting of the low power source indicator;

a notification remaining amount detector that detects a remaining power source amount larger by a predetermined amount than the lighting remaining amount stored in the lighting remaining amount storage unit; and a notifier that notifies information for promoting supply of the power source after the remaining power source amount larger than the lighting remaining amount by the predetermined amount is detected before the lighting remaining amount is detected.

Another aspect of the present invention provides an onboard device comprising:

a remaining amount detector that detects a remaining amount of a power source remaining in a vehicle;

a lighting detector that detects that a low power source indicator provided in the vehicle lights up;

a lighting remaining amount storage unit that stores, as a lighting remaining amount, the remaining power source amount detected by the remaining amount detector at a timing at which the lighting detector detects the lighting;

a notification remaining amount detector that detects a remaining power source amount larger by a predetermined amount than the lighting remaining amount stored in the lighting remaining amount storage unit; and a notifier that notifies information for promoting supply of the power source after the remaining power source amount larger than the lighting remaining amount by the predetermined amount is detected before the lighting remaining amount is detected.

Still other aspect of the present invention provides an information processing method comprising:

detecting a remaining amount of a power source remaining in a vehicle;

detecting that a low power source indicator provided in the vehicle lights up;

storing, as a lighting remaining amount, the detected remaining power source amount at a timing at which the lighting is detected in the detecting that the low power source indicator lights up;

detecting a remaining power source amount larger by a predetermined amount than the stored lighting remaining amount; and notifying information for promoting supply of the power source after the remaining power source amount larger than the lighting remaining amount by the predetermined amount is detected before the lighting remaining amount is detected.

Still other aspect of the present invention provides an information processing program for causing a computer to execute a method, comprising:

detecting a remaining amount of a power source remaining in a vehicle;

detecting that a low power source indicator provided in the vehicle lights up;

storing, as a lighting remaining amount, the detected remaining power source amount at a timing at which the lighting is detected in the detecting that the low power source indicator lights up;

detecting a remaining power source amount larger by a predetermined amount than the stored lighting remaining amount; and notifying information for promoting supply of the power source after the remaining power source amount larger than the lighting remaining amount by the predetermined amount is detected before the lighting remaining amount is detected.

Advantageous Effects of Invention

According to the present invention, it is possible to reduce a mental pressure on the driver.

BRIEF DESCRIPTION OF THE DRAWINGS

FIG. 2B is a view for explaining the operation of the onboard system according to the second example embodiment of the present invention;

FIG. 3B is a view for explaining the hardware arrangement of an onboard device according to the second example embodiment of the present invention;

FIG. 3E is a view for explaining the contents of information acquired by the onboard device according to the second example embodiment of the present invention;

FIG. 3F is a perspective view showing the outer appearance of the onboard device according to the second example embodiment of the present invention;

FIG. 4 is a flowchart for explaining the procedure of processing of the onboard device according to the second example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
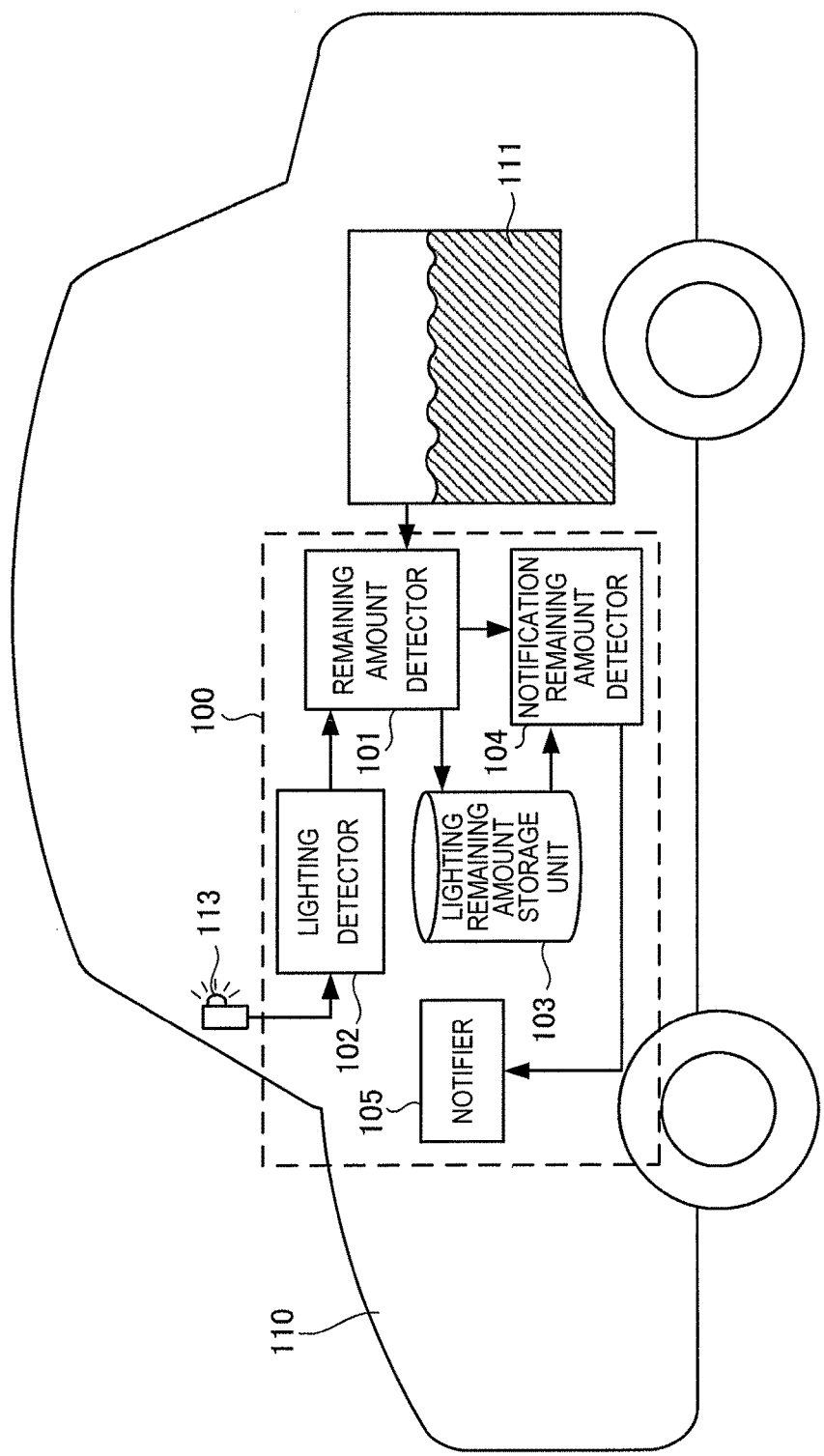
FIG. 1 is a block diagram showing the arrangement of an onboard system according to the first example embodiment of the present invention.

An onboard system 100 according to the first example embodiment of the present invention will be described with reference to FIG. 1. As shown in FIG. 1, the onboard system 100 includes a remaining amount detector 101, a lighting detector 102, a lighting remaining amount storage unit 103, a notification remaining amount detector 104, and a notifier 105.

The remaining amount detector 101 detects the remaining amount of a power source 111 remaining in a vehicle 110. The lighting detector 102 detects that a low fuel indicator 113 lights up. The lighting remaining amount storage unit 103 stores the remaining power source amount detected by the remaining amount detector 101 as a lighting remaining amount at the timing at which the lighting detector 102 detects the lighting of the low fuel indicator 113.

The notification remaining amount detector 104 detects that the remaining power source amount detected by the remaining amount detector 101 is a remaining power source amount larger by a predetermined amount than the lighting remaining amount stored in the lighting remaining amount storage unit 103. The notifier 105 notifies information for promoting supply of the power source after the notification remaining amount detector 104 has detected the remaining power source amount larger than the lighting remaining amount by the predetermined amount before the lighting remaining amount is detected.

The notification is made at a predetermined timing before the low fuel indicator lights up. It is therefore possible to reduce a mental pressure on the driver who is urged to find a power source supply point in a hurry after the low fuel indicator lights up.

Second Example Embodiment

Figure 2A:
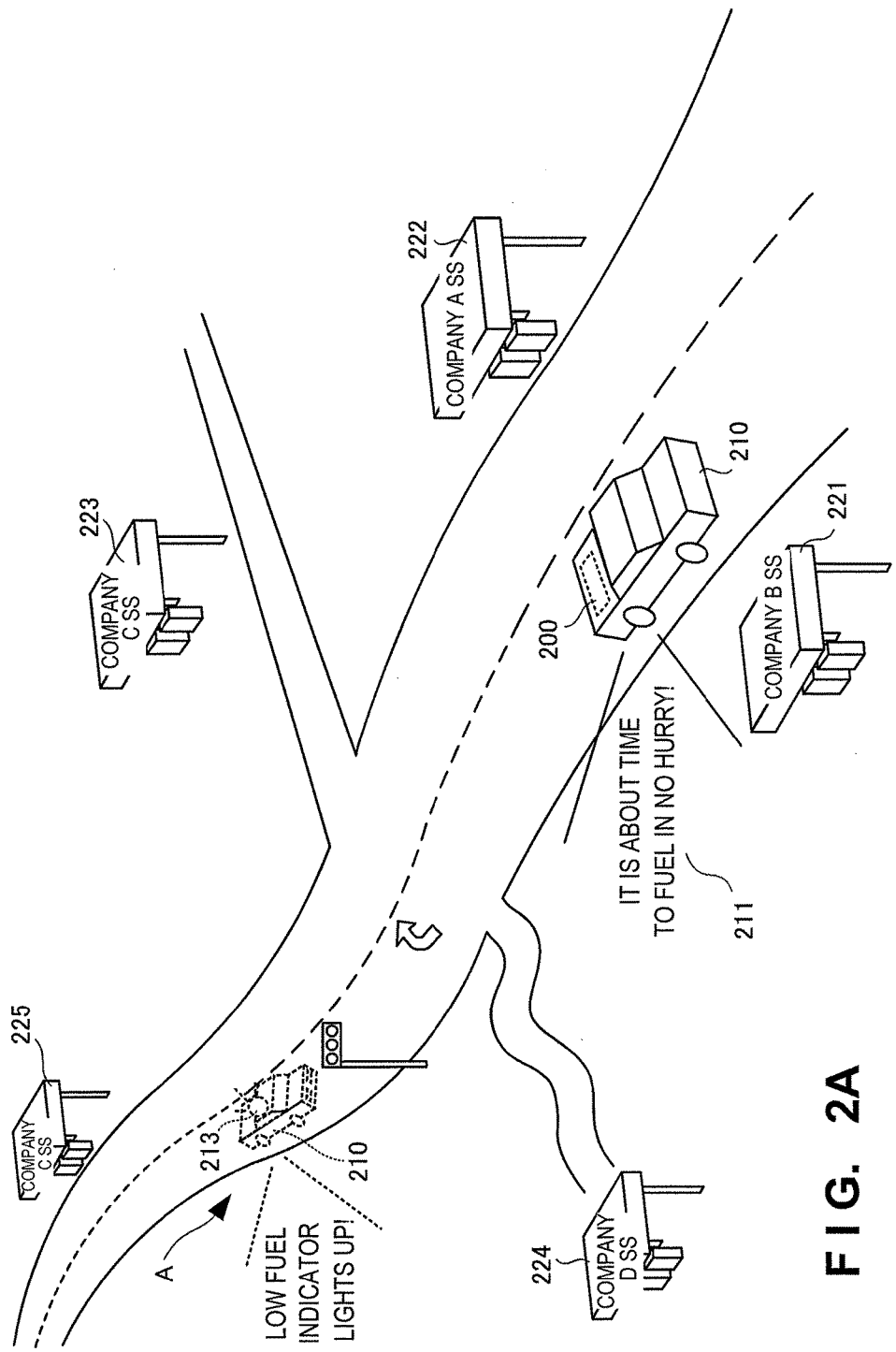
FIG. 2A is a view for explaining the operation of an onboard system according to the second example embodiment of the present invention.

An onboard system according to the second example embodiment of the present invention will be described next with reference to FIG. 2A and the like. FIG. 2A is a view for explaining the operation of an onboard system 200 according to this example embodiment. In this example embodiment, a vehicle that uses a fuel such as gasoline or light oil as a power source will be examined as an example. However, the present invention is not limited to this, and various power sources, for example, gasoline, light oil, natural gas, hydrogen, and electric power can be considered.

The onboard system 200 mounted on a vehicle 210 detects the remaining amount of the fuel in the vehicle 210. The onboard system 200 stores, as a lighting remaining amount, the remaining amount of the fuel at the timing at which a low fuel indicator 213 lighted up last time. The onboard system 200 further notifies information 211 for promoting fueling after a remaining fuel amount larger than the lighting remaining amount by a predetermined amount is detected until the lighting remaining amount is detected. A timing A at which the low fuel indicator 213 lights up is predicted, and the user is promoted to do fueling before the timing A. This allows the user to search for a fueling station in good time.

At this time, the onboard system 200 detects the traveling state of the vehicle, and sets a predetermined amount (addition amount) to be added to the lighting remaining amount in accordance with the traveling state. More specifically, in fuel-inefficient traveling, a notification needs to be made early, and the addition amount is therefore increased, as compared to fuel-efficient traveling. That is, for example, assume that the lighting remaining amount is 10 L. In fuel-efficient traveling, a notification is made when the notification remaining amount is 15 L. In fuel-inefficient traveling, a notification is made when the notification remaining amount is 20 L. Whether traveling is fuel-inefficient traveling or fuel-efficient traveling can be determined by obtaining the latest remaining fuel change speed and comparing it with a threshold. As the addition amount, an amount according to the traveling state history may be set. For example, the notification timing may be determined using the average value of fuel consumptions in an immediately preceding week. Alternatively, a plurality of notification timings may be set, and the notification timing may be changed in accordance with various traveling states. For example, the information of the driver who drives the vehicle may be acquired, and the notification timing may be changed on a driver basis. A region where the vehicle is traveling may be detected by a GPS (Global Positioning System), and the notification timing may be changed on a region basis. For example, map data may include fueling station density data. In a region including less fueling stations, the notification timing may be set earlier (that is, the predetermined remaining fuel amount to be notified may be made larger) than in a region including many fueling stations.

The onboard system 200 further includes a car navigation apparatus (not shown in FIG. 2A) as a route guidance system that notifies the driver of the vehicle of the route up to the destination. The car navigation apparatus that has received the notification of the information for promoting fueling may notify a fueling station 221 that exists at the position closest to the vehicle 210 at the notification timing.

Alternatively, the car navigation apparatus that has received the notification of the information for promoting fueling may notify, of fueling stations 221 to 225 that exist around the vehicle 210 at the notification timing, the fueling station 222 belonging to a fuel sales company (company A in FIG. 2A) determined by the driver in advance.

Otherwise, the car navigation apparatus that has received the notification of the information for promoting fueling may notify, of the fueling stations 221 to 225 that exist around the vehicle 210 at the notification timing, the plurality of fueling stations 221 to 224 reachable by the remaining fuel amount at that timing on a screen 230 shown in FIG. 2B. The screen 230 displays the plurality of fueling stations together with various kinds of attribute information. For example, a direction and distance 231 from the vehicle position, a fuel amount 232 necessary to visit the fueling station, an arrival time 233 at the fueling station of the visit, a fuel price 234 at each fueling station, and presence/absence 235 of discount in fuel sales may be displayed. The display order of the fueling stations may be changed in accordance with a magnitude of the information. That is, the closest fueling station, the fueling station of the lowest fuel consumption, the fueling station of the lowest price, or the like can be displayed on the top, and the driver can select a fueling station based on the criterion of his/her own. Once sorting is done, the criterion of the sorting may be stored, and display may be done first by the sorting. Fuel price information or the like can be acquired by downloading data from a specific server via the Internet. In addition, the onboard system 200 may collect real-time information by directly communicating with the fueling stations 221 to 225 using a wireless LAN or 3G network. The attributes such as a price mentioned here are merely examples, and the present invention is not limited to these. In addition to these, a plurality of attributes may generally be combined, a recommendation level corresponding to the driver may be calculated using a predetermined formula, and the fueling stations may be displayed in the order of recommendation level.

Alternatively, the car navigation apparatus that has received the notification of the information for promoting fueling may notify, of the fueling stations 221 to 225 that exist around the vehicle 210 at the notification timing, the fueling station 224 closest to the route up to the destination.

Upon receiving the notification of the information for promoting fueling, the car navigation apparatus may notify, of the plurality of fueling stations 222 to 225 that exist within a predetermined distance from the route up to the destination, the fueling station 224 that can be determined as a fueling station to pass to arrive at the destination earliest.

Upon receiving the notification of the information for promoting fueling, the car navigation apparatus may notify, of the plurality of fueling stations 222 to 225 that exist within a predetermined distance from the route up to the destination, the fueling station 223 that can be determined as a fueling station to pass to minimize the total fuel amount to be used up to the destination.

(Outline of Onboard Device)

Figure 3A:
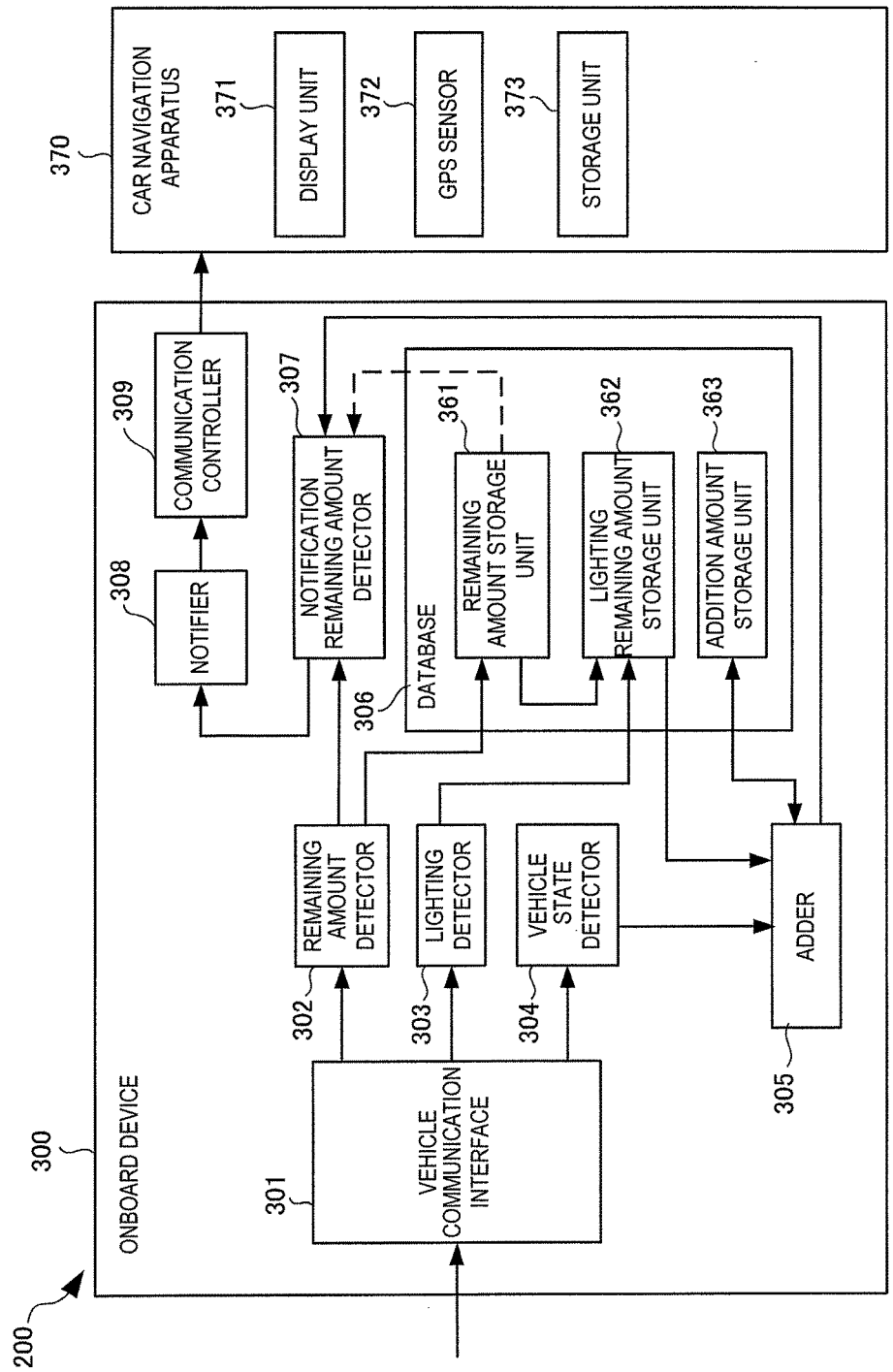
FIG. 3A is a view for explaining the arrangement of the onboard system according to the second example embodiment of the present invention.

FIG. 3A is a block diagram showing the arrangement of the onboard system 200. Referring to FIG. 3A, the onboard system 200 includes an onboard device 300 and a car navigation apparatus 370. The onboard device 300 includes a vehicle communication interface 301, a remaining amount detector 302, a lighting detector 303, a vehicle state detector 304, an adder 305, a database 306, a notification remaining amount detector 307, and a notifier 308. The car navigation apparatus 370 includes a display unit 371, a GPS sensor 372, and a storage unit 373. As the vehicle communication interface, for example, an OBD-II interface is usable.

The vehicle communication interface 301 is an interface that acquires the information of a self-diagnosis result in the engine electronic control apparatus of the vehicle 210. The remaining amount detector 302 detects the amount of the fuel remaining in the vehicle 210 using the data acquired via the vehicle communication interface 301. Similarly, the lighting detector 303 detects that the low fuel indicator 213 lights up. In addition, the vehicle state detector 304 acquires traveling information such as a traveling speed and a brake count via the vehicle communication interface 301. However, the present invention is not limited to this, and a lighting signal input to the low fuel indicator 213 may directly be detected.

The database 306 includes a remaining amount storage unit 361, a lighting remaining amount storage unit 362, and an addition amount storage unit 363.

The remaining amount storage unit 361 stores the remaining fuel amount detected by the remaining amount detector 302. The lighting remaining amount storage unit 362 stores the remaining fuel amount at the timing at which the lighting detector 303 detects the lighting of the low fuel indicator 213. The addition amount storage unit 363 stores an addition amount to be added to the lighting remaining amount to obtain a notification remaining amount for each traveling state. For example, as the storage manner, the addition amount is stored such that 5 L is stored in fuel-efficient traveling, and 10 L is stored in fuel-inefficient traveling. More finely, the addition amount may be defined in the addition amount storage unit 363 such that, for example, the addition amounts are set to 3 L for 0 to 20 km/h, 5 L for 20 to 40 km/h, and 8 L for 40 km/h to 60 km/h. The addition amount may be determined in accordance with not only the vehicle speed but also the degree of acceleration or deceleration or ON/OFF of an air conditioner.

The adder 305 reads out an addition amount corresponding to the traveling information acquired by the vehicle state detector 304 from the addition amount storage unit 363, adds the addition amount to the lighting remaining amount to obtain a notification remaining amount, and provides it to the notification remaining amount detector 307.

The notification remaining amount detector 307 compares the provided notification remaining amount with the remaining amount detected by the remaining amount detector 302 or the remaining fuel amount stored in the remaining amount storage unit 361, detects that remaining fuel amount notification remaining amount, and notifies the notifier 308 of it. Upon receiving the notification, the notifier 308 notifies the driver or the car navigation apparatus 370 to do fueling before lighting of the low fuel indicator 213. The notifier 308 calculates a distance that the vehicle can travel by the remaining fuel as needed, and notifies the car navigation apparatus 370 of the travelable distance. At this time, the travelable distance may be calculated from the average fuel consumption in the past. Upon receiving the notification from the notifier 308, the car navigation apparatus 370 notifies the driver of a message for promoting fueling before detection of the lighting remaining amount. In particular, the car navigation apparatus 370 notifies the driver of the positions of a plurality of fueling stations within the travelable distance and the routes to there, as shown in FIG. 2B, based on a map stored in the storage unit 373, the fueling stations on the map, the vehicle position detected using the GPS sensor 372, and the travelable distance.

FIG. 3B is a block diagram showing the hardware arrangement of the onboard device. Referring to FIG. 3B, a CPU (Central Processing Unit) 310 is a processor for arithmetic control, which implements the functional components shown in FIG. 3A by executing various programs. A flash ROM (Read Only Memory) 320 is provided integrally with the CPU 310, and is incorporated in a CPU chip molded by a resin. The flash ROM 320 stores initial data, permanent data of programs and the like, and the programs. A RAM 315 functions as an arithmetic work area to hold temporary data written after the start of the operation of the CPU, and is also provided integrally with the CPU 310. That is, the CPU core, the flash ROM, and the RAM are mounted on a so-called "die". A communication controller 309 communicates with the car navigation apparatus 370 using, for example, the Bluetooth® technology.

Note that the CPU 310 is not limited to the single CPU. A plurality of CPUs may exist, or a CPU for image processing may be included. The CPU 310 prepares a processing result in a mass flash memory 350, and entrusts subsequent transmission to the communication controller 309.

The RAM 315 is a random access memory used by the CPU 310 as a work area for temporary storage. An area to store temporary data written after the start of the operation of the CPU 310 is ensured.

The flash ROM 320 stores vehicle communication command data 321, vehicle acquisition information (for example, OBD-II data) 322, and an analysis table 323.

The vehicle communication command data 321 is an input/output command used by the vehicle communication interface 301 to obtain vehicle acquisition information or a diagnostic code of self-diagnosis. The vehicle acquisition information (OBD-II data) 322 is the vehicle acquisition information or the diagnostic code of self-diagnosis obtained by the vehicle communication interface 301. The analysis table 323 is a table used when performing primary processing of the vehicle acquisition information (OBD-II data) 322.

The flash ROM 320 further stores a remaining amount detection module 351, a lightning detection module 352, a traveling state detection module 353, an addition module 354, a notification remaining amount detection module 355, and a notification module 356. By executing these modules, the CPU 310 functions as the remaining amount detector 302, the lighting detector 303, the vehicle state detector 304, the adder 305, the database 306, the notification remaining amount detector 307, and the notifier 308 shown in FIG. 3A.

The mass flash memory 350 stores data and various parameters acquired from the vehicle. In addition, the database 306 is stored in the mass flash memory 350.

Figure 3C:
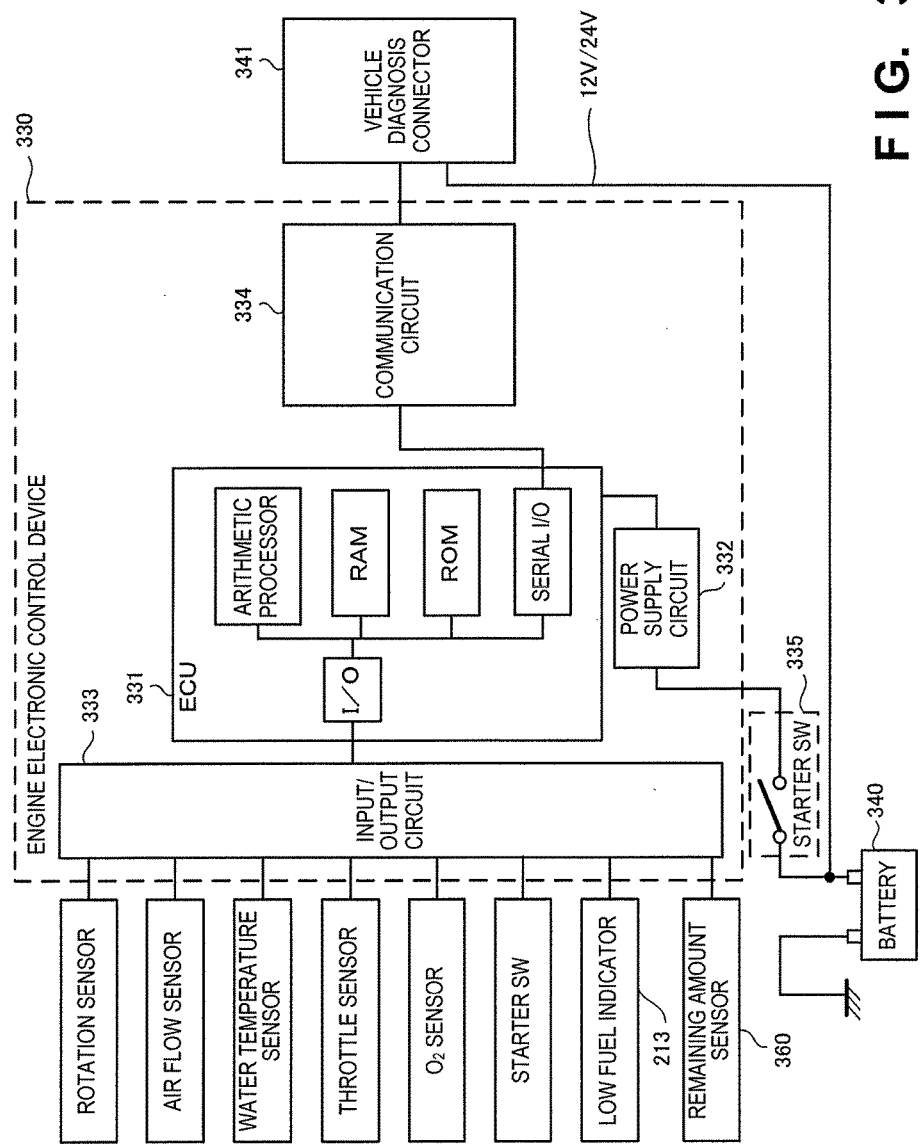
FIGS. 3C and 3D are views for explaining the hardware arrangement of the onboard system according to the second example embodiment of the present invention.
Figure 3D:
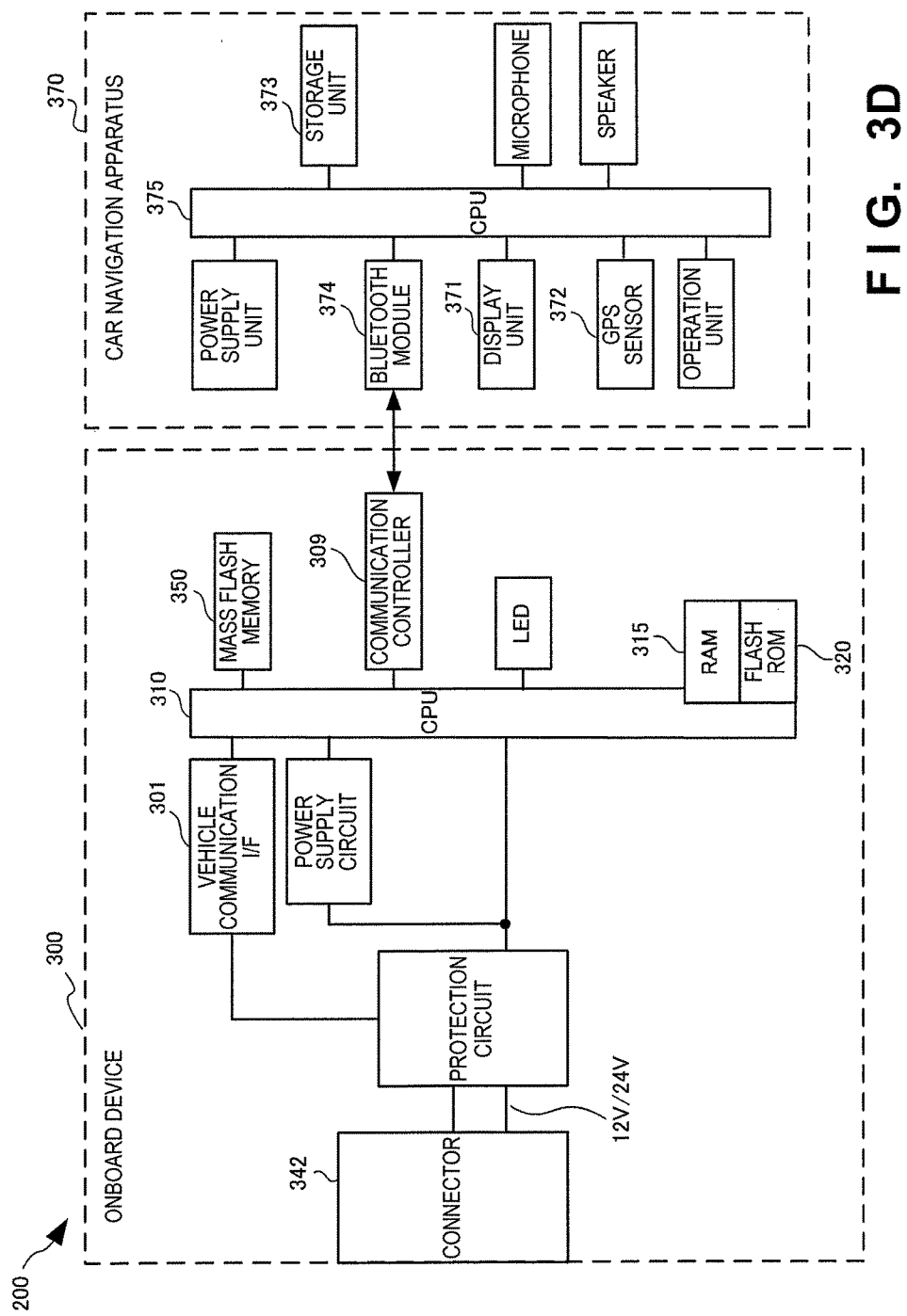

FIGS. 3C and 3D are block diagrams showing the arrangement and association of an engine electronic control device 330, the onboard device 300, and the car navigation apparatus 370 according to this example embodiment.

The engine electronic control device 330 is an electronic circuit that controls the engine of the vehicle 210, and includes an engine control unit (ECU in FIG. 3C) 331 that performs general control, a power supply circuit 332 that supplies power for an operation to the engine control unit 331, an input/output circuit 333 that transmits signals from various kinds of sensors for detecting the state of the vehicle 210 to the engine control unit 331, and a communication circuit 334 that communicates with the outside via a vehicle diagnosis connector (OBD-II) 341. The engine electronic control device 330 is connected, via the input/output circuit 333, to the low fuel indicator 213 and a remaining amount sensor 360 provided on a fuel tank, and notifies the onboard device 300 of the lighting timing of the low fuel indicator 213 via the vehicle diagnosis connector 341. The engine electronic control device 330 also notifies the onboard device 300 of the value of the remaining amount of the fuel detected by the remaining amount sensor 360 via the vehicle diagnosis connector 341. Furthermore, the engine electronic control device 330 receives detection values of various kinds of sensors provided on the vehicle, and sends them to the onboard device 300 via the connectors 341 and 342 as a variety of CAN data shown in FIG. 3E.

The vehicle acquisition information transmitted via the vehicle diagnosis connector 341 is acquired based on a command from the vehicle communication interface 301 of the onboard device 300. Flow data that flows on a bus can also be acquired. Power supply from a battery 340 to the power supply circuit 332 of the engine electronic control device 330 is shut down by a starter switch (SW in FIG. 3C) 335. Note that power (+12 V/+24 V) for the onboard device 300 is always supplied via the vehicle diagnosis connector 341 without an intervention of the starter switch 335.

The connector 342 of the onboard device 300 is connected to the vehicle communication interface 301 via a protection circuit. Vehicle information from the engine electronic control device 330 is stored in the mass flash memory 350 under the control of the CPU 310.

The communication controller 309 wirelessly communicates with a Bluetooth® module 374 of the car navigation apparatus 370 via a Bluetooth® protocol. A CPU 375 of the car navigation apparatus 370 receives, from the onboard device 300, information representing that the fuel has reached the notification remaining amount. Note that here, the communication between the onboard device 300 and the car navigation apparatus 370 is performed using Bluetooth®. However, the present invention is not limited to this, and any protocol is usable if it is a short distance communication protocol such as Wifi-Direct.

FIG. 3E is a view showing the structure of vehicle acquisition information that the onboard device 300 acquires via a vehicle communication interface. Referring to FIG. 3E, a PID 391 is the identifier of vehicle acquisition information acquired via the vehicle communication interface. Contents 392 are the contents of information identified by each PID 391. For example, details of the engine rotational speed, the velocity, the degree of throttle opening, the time elapsed after the engine start, a remaining amount 393 of the fuel, and presence/absence 394 of lighting of the low fuel indicator are disclosed in SAE (Society of Automotive Engineers) standard J/1979 or the like.

FIG. 3F is a view showing the outer appearance of the onboard device 300. The onboard device 300 is connected to the vehicle diagnosis connector 341, acquires and accumulates CAN information from an engine computer or the like, and sends the information to the car navigation apparatus 370 via the Bluetooth®. The connection is completed only by connecting the connector 342 of the onboard device 300 to the vehicle diagnosis connector 341. A back surface 382 of the onboard device 300 is provided with a lamp representing that communication with the car navigation apparatus is being performed, and a lamp representing that vehicle acquisition information (OBD information) is being received from the vehicle.

FIG. 4 is a flowchart showing the procedure of processing in a case in which the lightning detection module 352 is executed by the CPU 310 of the onboard device.

In step S401, it is detected whether the low fuel indicator 213 lights up. If the low fuel indicator 213 lights up, the process advances to step S403 to read out the remaining fuel amount at that timing from the remaining amount storage unit 361. In step S405, the remaining fuel amount at the timing when the low fuel indicator 213 lights up is stored in the lighting remaining amount storage unit 362.

Figure 5:
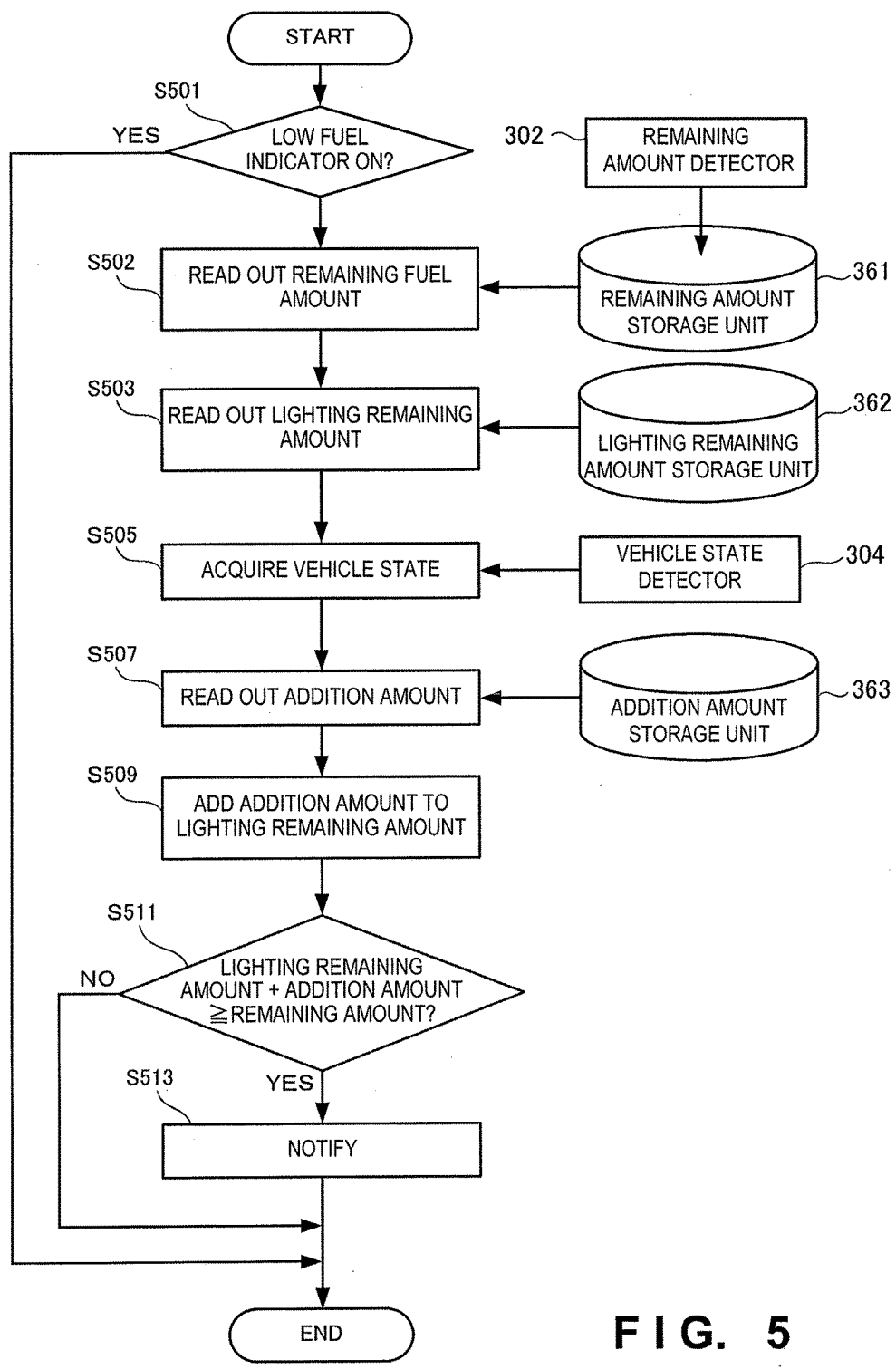
FIG. 5 is a flowchart for explaining the procedure of processing of the onboard device according to the second example embodiment of the present invention.

FIG. 5 is a flowchart showing the procedure of processing in a case in which the CPU 310 of the onboard device executes the traveling state detection module 353 to the notification remaining amount detection module 355.

First, in step S501, it is detected whether the low fuel indicator lights up. If the low fuel indicator 213 already lights up, the processing ends. If the low fuel indicator 213 does not light up, the process advances to step S502 to detect the remaining amount of the fuel. More specifically, the remaining fuel amount is read out from the remaining amount storage unit 361.

Next, the process advances to step S503 to read out the lighting remaining amount from the lighting remaining amount storage unit 362. Next, in step S505, the vehicle state is acquired from the vehicle state detector 304.

Subsequently, in step S507, an addition amount corresponding to the acquired vehicle state is read out from the addition amount storage unit 363. In step S509, the addition amount read out in step S507 is added to the lighting remaining amount read out in step S503. In step S511, it is determined whether the detected remaining amount is equal to or less than the sum of the lighting remaining amount and the addition amount. If the detected remaining amount is equal to or less than the sum of the lighting remaining amount and the addition amount, the process advances to step S513 to transit to notification processing.

As described above, according to this example embodiment, a notification is made at a predetermined timing before the low fuel indicator lights up. It is therefore possible to reduce a mental pressure on the driver who is urged to find a power source supply point in a hurry after the low fuel indicator lights up.

Note that the onboard device 300 may further include a fueling history storage unit that stores a fueling history in the vehicle 210. The notifier may, for example, obtain the temporal frequency distribution of power source supply timings of the vehicle based on the power source supply history in the fueling history storage unit and notify the information for promoting fueling at a timing based on the frequency distribution. For example, for a vehicle that is fueled often on the evening of Thursday, fueling may be promoted at a corresponding timing.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

This application claims the benefit of Japanese Patent Application No. 2014-258081 filed on Dec. 19, 2014, which is hereby incorporated by reference herein in its entirety.

The invention claimed is:

1. An onboard system comprising:
   a remaining amount detector that detects a remaining amount of a power source remaining in a vehicle;
   a lighting detector that detects that a low power source indicator provided in the vehicle lights up;
   a lighting remaining amount storage unit that stores, as a lighting remaining amount, the remaining power source amount detected by said remaining amount detector at a timing at which said lighting detector detects the lighting of the low power source indicator;
   a notification remaining amount detector that detects a remaining power source amount larger by a predetermined amount than the lighting remaining amount stored in said lighting remaining amount storage unit; and
   a notifier that notifies information for promoting supply of the power source after the remaining power source amount larger than the lighting remaining amount by the predetermined amount is detected before the lighting remaining amount is detected.

2. The onboard system according to claim 1, further comprising a traveling state detector that detects a traveling state of the vehicle,
   wherein said notification remaining amount detector sets an amount according to the traveling state as the predetermined amount.

3. The onboard system according to claim 2, wherein said notification remaining amount detector sets an amount according to a history of the traveling state as the predetermined amount.

4. The onboard system according to claim 1, further comprising a route guidance system that notifies a driver of the vehicle of a route up to a destination,
   wherein said notifier notifies said route guidance system of the information for promoting supply of the power source, and
   upon receiving the notification from the notifier, said route guidance system notifies a power source supply point that exists at a position closest to the vehicle at the timing.

5. The onboard system according to claim 1, further comprising a route guidance system that notifies a driver of the vehicle of a route up to a destination,
   wherein said notifier notifies said route guidance system of the information for promoting supply of the power source, and
   upon receiving the notification from the notifier, said route guidance system notifies, of power source supply points that exist around the vehicle at the timing, a power source supply point belonging to a predetermined power source supply company.

6. The onboard system according to claim 1, further comprising a route guidance system that notifies a driver of the vehicle of a route up to a destination,
   wherein said notifier notifies said route guidance system of the information for promoting supply of the power source, and
   upon receiving the notification from the notifier, said route guidance system notifies a plurality of power source supply points reachable by the remaining amount of the power source at the timing.

7. The onboard system according to claim 1, further comprising a route guidance system that notifies a driver of the vehicle of a route up to a destination,
wherein said notifier notifies said route guidance system of the information for promoting supply of the power source, and
upon receiving the notification from the notifier, said route guidance system notifies a power source supply point closest to the route up to the destination.

8. The onboard system according to claim 1, further comprising a route guidance system that notifies a driver of the vehicle of a route up to a destination,
wherein said notifier notifies said route guidance system of the information for promoting supply of the power source, and
upon receiving the notification from the notifier, said route guidance system notifies, of a plurality of power source supply points within a predetermined distance from the route up to the destination, a power source supply point that can be determined as a power source supply point to pass to arrive at the destination earliest.

9. The onboard system according to claim 1, further comprising a route guidance system that notifies a driver of the vehicle of a route up to a destination,
wherein said notifier notifies said route guidance system of the information for promoting supply of the power source, and
upon receiving the notification from the notifier, said route guidance system notifies, of a plurality of power source supply points within a predetermined distance from the route up to the destination, a power source supply point that can be determined as a power source supply point to pass to minimize a total amount of the power source to be used up to the destination.

10. An onboard device comprising:
a remaining amount detector that detects a remaining amount of a power source remaining in a vehicle;
a lighting detector that detects that a low power source indicator provided in the vehicle lights up;
a lighting remaining amount storage unit that stores, as a lighting remaining amount, the remaining power source amount detected by said remaining amount detector at a timing at which said lighting detector detects the lighting;
a notification remaining amount detector that detects a remaining power source amount larger by a predetermined amount than the lighting remaining amount stored in said lighting remaining amount storage unit; and
a notifier that notifies information for promoting supply of the power source after the remaining power source amount larger than the lighting remaining amount by the predetermined amount is detected before the lighting remaining amount is detected.

11. An information processing method comprising:
detecting a remaining amount of a power source remaining in a vehicle;
detecting that a low power source indicator provided in the vehicle lights up;
storing, as a lighting remaining amount, the detected remaining power source amount at a timing at which the lighting is detected in the detecting that the low power source indicator lights up;
detecting a remaining power source amount larger by a predetermined amount than the stored lighting remaining amount; and
notifying information for promoting supply of the power source after the remaining power source amount larger than the lighting remaining amount by the predetermined amount is detected before the lighting remaining amount is detected.

12. A non-transitory computer readable medium storing a program for causing a computer to execute a method, comprising:
detecting a remaining amount of a power source remaining in a vehicle;
detecting that a low power source indicator provided in the vehicle lights up;
storing, as a lighting remaining amount, the detected remaining power source amount at a timing at which the lighting is detected in the detecting that the low power source indicator lights up;
detecting a remaining power source amount larger by a predetermined amount than the stored lighting remaining amount; and
notifying information for promoting supply of the power source after the remaining power source amount larger than the lighting remaining amount by the predetermined amount is detected before the lighting remaining amount is detected.

* * * * *